United States Patent
Liao et al.

(10) Patent No.: US 8,160,276 B2
(45) Date of Patent: Apr. 17, 2012

(54) AUDIO SYSTEM AND RELATED METHOD INTEGRATED WITH ULTRASOUND COMMUNICATION FUNCTIONALITY

(75) Inventors: Tung-Tsai Liao, Hsinchu (TW); Li-Sheng Lo, Hsinchu (TW)

(73) Assignee: Generalplus Technology Inc., Hsinchu (TW)

( * ) Notice: Subject to any disclaimer, the term of this patent is extended or adjusted under 35 U.S.C. 154(b) by 1145 days.

(21) Appl. No.: 11/965,584

(22) Filed: Dec. 27, 2007

(65) Prior Publication Data

US 2008/0165622 A1    Jul. 10, 2008

(30) Foreign Application Priority Data

Jan. 9, 2007    (TW) ............................... 96100843 A (51) Int. Cl.
*H04R 3/00*        (2006.01)
*H04R 5/02*        (2006.01)
(52) U.S. Cl. ............ 381/111; 381/311; 367/2; 367/127; 709/220; 600/559
(58) Field of Classification Search .................. 381/311; 384/74, 77, 111
See application file for complete search history.

(56) References Cited

U.S. PATENT DOCUMENTS

| | | | |
|---|---|---|---|
| 6,263,094 B1 * | 7/2001 | Rosich et al. | 382/128 |
| 6,631,196 B1 * | 10/2003 | Taenzer et al. | 381/316 |
| 6,709,407 B2 * | 3/2004 | Fatemi | 600/559 |
| 2006/0136544 A1 * | 6/2006 | Atsmon et al. | 709/200 |
| 2007/0112942 A1 * | 5/2007 | Moquin et al. | 709/220 |
| 2008/0112885 A1 * | 5/2008 | Okunev et al. | 424/9.1 |

* cited by examiner

*Primary Examiner* — Kiesha Bryant
*Assistant Examiner* — Dmitriy Yemelyanov
(74) *Attorney, Agent, or Firm* — WPAT, PC; Justin King (57) ABSTRACT

Audio system and related method integrated with ultrasound communication functionality are provided. A communication transmitting device of proposed invention modulates a communication signal of communication functionality to a high-frequency sound and transmits the high-frequency sound by an ordinary audio transmitter. A communication receiving device of proposed invention receives the high-frequency sound with an ordinary audio receiver and demodulates it to retrieve the communication signal, and then the communication device can use the communication signal. The proposed audio sound transmitter/receiver can be implemented using low-cost audio speaker/microphone, such that a cost for implementing communication functionality can be reduced.

18 Claims, 7 Drawing Sheets

AUDIO SYSTEM AND RELATED METHOD INTEGRATED WITH ULTRASOUND COMMUNICATION FUNCTIONALITY

FIELD OF THE INVENTION

Audio system and related method integrated with ultrasound communication functionality are provided, more specifically, audio systems, devices and method integrated with ultrasound/quasi-ultrasound communication functionality implemented by ordinary audio speakers and microphones are provided.

BACKGROUND OF THE INVENTION

Electronic devices and systems with remote (wireless) communication functionality are not restricted by signal transmission lines, so such remote communication functionality has become one of the most popular consumer functionalities.

As known by who familiar with related art, a system with remote communication functionality has to transmit communication signals between a transmitter and a receiver in a remote (wireless) fashion. Generally speaking, known prior arts carry the remote communication signals using infra-red (IR) light or electromagnetic waves, such as radio-frequency (RF) or Bluetooth. However, the above prior arts are expensive and thus can not be widely adopted.

On the other hand, ultrasound and/or quasi-ultrasound have been adopted to implement various functionalities, such as ranging (distance estimation) or obstacle detection. However, specific ultrasound actuators or high-frequency oscillators must be adopted for ultrasound transmitting, thus the cost is also expensive.

On the contrary, controllers and/or microprocessors with audio playback and receiving functionality have been widely used with very low cost, so a technique implementing remote communication functionality using ordinary audio receivers and transmitters (e.g., ordinary microphones and speakers) will be very valuable.

SUMMARY OF THE INVENTION

To overcome various disadvantages of prior arts and to make full use of the low-cost ordinary voice processors, audio devices and/or audio systems, one objective of the invention is providing an audio system integrated with remote communication functionality, the system includes a first device (a communication transmitting device) and a second device (a communication receiving device). The first device can include a first signal processor and an acoustic transmitter (preferably an audio transmitter). The second device can includes an acoustic receiver (preferably an audio receiver) and a second signal processor. In the disclosed invention, the acoustic transmitter can be an ordinary audio speaker or a beeper capable of transmitting audio sounds that human can hear. The acoustic receiver can be an ordinary audio microphone (e.g., a capacitor microphone) capable of receiving sounds that human can hear. While implementing remote communication functionality with such ordinary audio system, the disclosed first signal processor in the first device can modulates a communication signal to a ultrasound/quasi-ultrasound with a frequency higher than that of ordinary audio sound. Then the acoustic transmitter in the first device can transmit the ultrasound/quasi-ultrasound. On the other hand, the second device can receive the ultrasound/quasi-ultrasound with its acoustic receiver, so the second signal processor can demodulate the received ultrasound/quasi-ultrasound to retrieve the original communication signal. Base on the demodulated communication signal, the second device can function and interact accordingly, therefore a remote communication functionality is established between the first and the second devices.

In an embodiment of the disclosed audio system, the first signal processor in the first device carries the communication signal in an envelope of ultrasound/quasi-ultrasound the by performing amplitude-modulation. More specifically, the first signal processor can transfer the communication signal to a corresponding baseband signal and then modulates the ultrasound/quasi-ultrasound by amplitude-modulation according to the baseband signal.

On the other hand, the second signal processor in the second device can exemplarily include a band-pass filter, an envelope detector and a comparator. The band-pass filter is capable of filtering the audio sound and keeping the ultrasound/quasi-ultrasound; the envelope detector is capable of detecting an envelope of the ultrasound/quasi-ultrasound, and the comparator is capable of comparing the envelope with a pre-determined signal level such that the communication signal can be retrieved. Also the second signal processor can optionally include a low-pass filter capable of filtering the ultrasound/quasi-ultrasound and keeping the audio sound, and an audio processor capable of handling the audio sound.

In the disclosed invention, the communication signal is carried by ultrasound/quasi-ultrasound exceeding human hearing, so the normal audio playback/receiving functionality of the audio system will not be affected. Because common ordinary audio systems can be used to implement remote communication functionality, the cost is lower such that the conveniences of remote communication can be widely prevailed. In the invention, the communication functionality can refer to various general interactions among different devices, for example, it can include transferring of information, data (like text data and/or multimedia data) and/or commands, such that the communication transmitting device can perform remote-control on the communication receiving device.

To make the second device capable of interacting with the first device, the second device can further includes a third signal processor and a second acoustic transmitter. The third signal processor capable of modulating a second communication signal to a second ultrasound/quasi-ultrasound, which is transmitted by the second acoustic transmitter. On the other hand, the first device can also include a second acoustic receiver and a fourth signal processor. In the first device, the second acoustic receiver is adopted to receive the second ultrasound/quasi-ultrasound, which is then demodulated by the fourth signal processor to retrieve the second communication signal. That is, in the disclosed technique, not only can the first device communicate with the second device, but also the second device can communicate with the first device so as to enhance mutual interaction capability between the first device and the second device.

Based on the same technique, another objective of the invention is providing an audio device integrated with remote communication functionality, like the first and/or second devices mentioned above.

Another objective of the invention is providing a method and a technique capable of integrating remote communication functionality to an ordinary audio system. While implementing the disclosed remote communication functionality, a communication signal required for remote communication is modulated to a ultrasound/quasi-ultrasound, and an audio transmitter capable of transmitting audio sounds is adopted to transmit the ultrasound/quasi-ultrasound. Then an audio receiver capable of receiving audio sounds is adopted to receive the ultrasound/quasi-ultrasound, and the received ultrasound/quasi-ultrasound is demodulated to retrieve the communication signal. Thus the remote functionality can be implemented between various audio devices.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
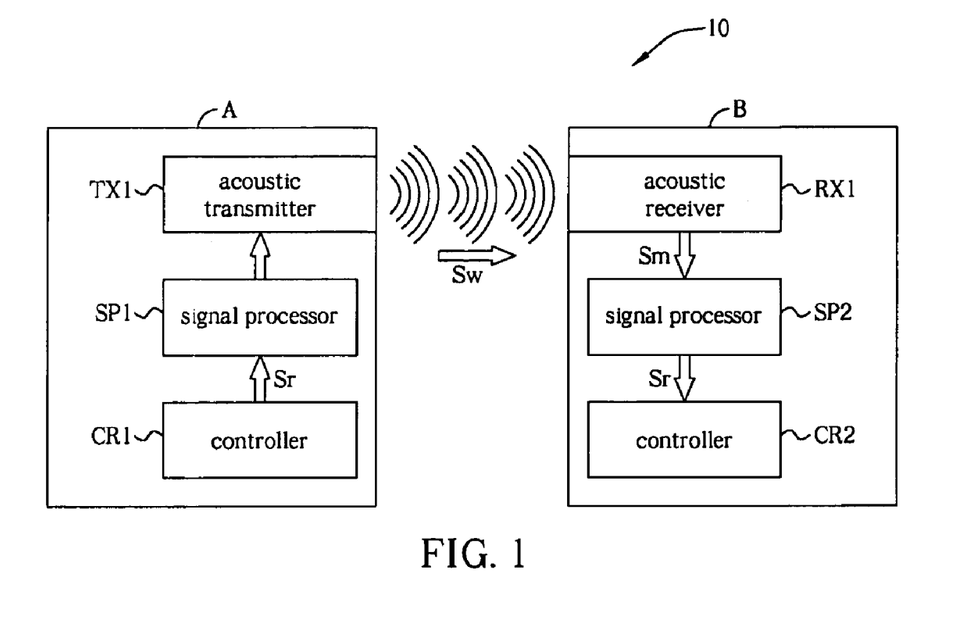
FIG. 1 illustrates an audio system according to one embodiment of the invention.

Please refer to FIG. 1, which illustrates an exemplary block diagram of an audio system 10 according to one embodiment of the invention. The audio system 10 can have a plurality of audio electronic devices; devices A and B are illustrated in FIG. 1 for exemplary explanation. The device A (which is considered as a first device) can include a controller CR1, a signal processor SP1 (as a first signal processor) and an acoustic transmitter TX1 (preferably an audio transmitter). The device B (as a second device) can include an acoustic receiver RX1 (preferably an audio receiver), a signal processor SP2 (considered as a second signal processor) and a controller CR2. The acoustic transmitter TX1 in the device A is capable of transmitting audio sound that human can hear, like an ordinary audio speaker and/or a beeper. The acoustic transmitter can be an ordinary audio microphone, like a capacitor microphone. As mentioned above, the devices A and B can be implemented using ordinary audio devices.

In the device A, the controller CR1 controls the communication functionality of the audio system 10. For example, when the device A communicates with the device B, the controller CR1 provides a communication signal Sr. Then the signal processor SP1 is capable of modulating the communication signal Sr to a corresponding high-frequency signal, such that the acoustic transmitter TX1 can transmit the high-frequency signal as a high-frequency sound Sw. On the other hand, the acoustic receiver RX1 in the device B receives the high-frequency sound Sw, and transfers it to an corresponding electronic signal Sm. The signal processor SP2 demodulates the signal Sm to retrieve the communication Sr, then the controller CR2 which controls operations of the device B can perform corresponding actions according to the retrieved communication signal Sr. In this way, the device A as a communication transmitting device can communicate with the device B as a communication receiving device.

In the devices A and B, the controllers CR1 and CR2 can be implemented with microprocessors. The signal processor SP1 in the device A can be exemplarily implemented with a digital-to-analogue converter capable of driving the acoustic transmitter TX1 for transmitting the digital communication signal Sr as the high-frequency sound Sw. The signal processor SP2 in the device B can exemplarily include an amplifier, a filter, a envelope detector and a comparator, such that the communication signal carried in the signal Sm can be amplified and extracted by filtering.

In a preferred embodiment of the invention, the high-frequency sound Sw can be an ultrasound/quasi-ultrasound with a frequency range higher than that of audio sounds which human can hear. In other words, the high-frequency sound Sw is beyond the range which human can hear, so normal audio playback and/or receiving functionality is not affected (not interfered) by the disclosed remote communication functionality. For example, whether the acoustic transmitter TX1 in the device A is playing audio sounds that human can hear, it can also transmit the high-frequency sound Sw carrying the communication signal at the same time. Similarly, whether the acoustic receiver RX1 in the device B is receiving (or recording) audio sound that human can hear, it can also receive the high-frequency sound Sw simultaneously.

Although ordinary audio transmitters and/or receivers are designed for audio sounds, usually their acceptable sound bands extend to high-frequency spectrum suitable for transmitting/receiving high-frequency sounds. Therefore, ordinary audio systems can be adopted to implement a low-cost remote communication functionality according to the disclosed technology, and convenience of wireless remote communication can widely prevail. In the disclosed invention, the aforementioned communication functionality can refer to various general interactions among different devices, for example, it can include transferring and exchanging of information, data (like text data and/or multimedia data) and/or commands such that the communication transmitting device can perform remote-control on the communication receiving device.

Figure 2:
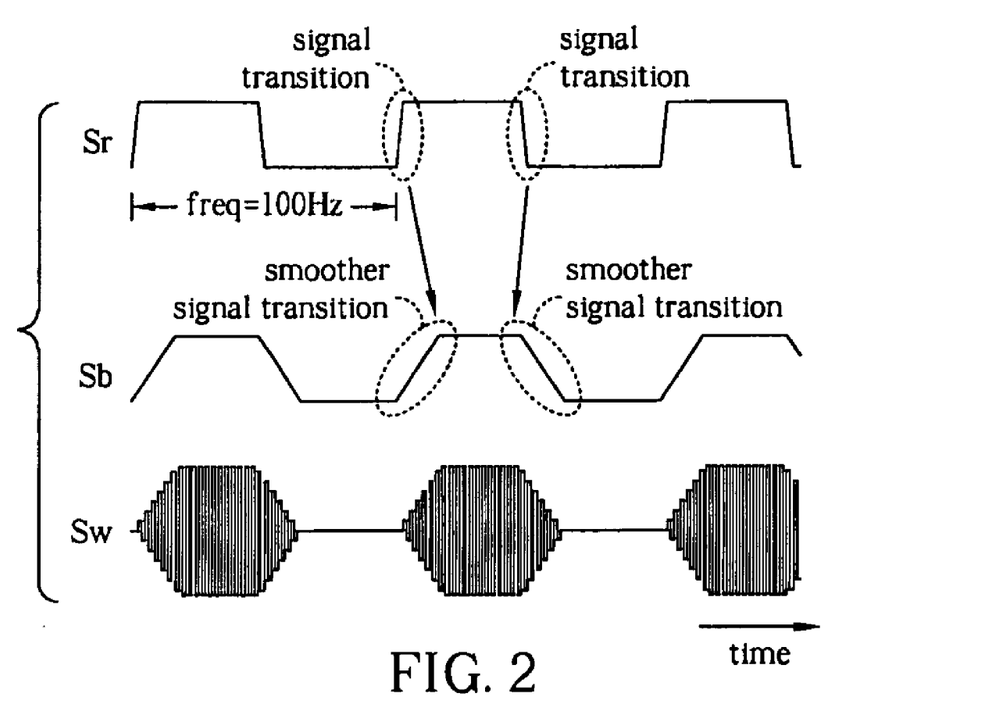
FIG. 2 illustrates a communication signal being carried in a high-frequency sound in the disclosed communication transmitting device according to one embodiment of the invention.

Please refer to FIG. 2. Following FIG. 1, FIG. 2 illustrates an embodiment for carrying the communication signal to the high-frequency sound in the communication transmitting device (e.g., device A). The transverse axis of each waveform in FIG. 2 means time, and the longitudinal axis means amplitude. In this embodiment, amplitude modulation is adopted to carrying the communication signal in an envelope of the high-frequency sound. As shown in FIG. 2, the (digital) communication signal Sr is first transferred (converted) to a baseband signal Sb (by the signal processor SP1 in FIG. 1, for example), then a carrier is modulated in the baseband signal Sb such that information in the communication signal is carried in the high-frequency sound Sw by amplitude-modulation. For example, the signal processor SP1 can have a digital-to-analog converter driven by different amplitudes of the baseband signal Sb different time points separated by regular time intervals, so the digital-to-analog converter can drive the acoustic transmitter accordingly. Please note that signal transitions in the communication signal Sr are transferred to smother transitions in the baseband signal Sb so as to reduce audio interference when the baseband signal Sb is modulated to the high-frequency sound. If the transitions in the baseband signal Sb remain sharp and rapid (i.e., transitioning from low level to high level or from high level to low level in a short time), an audio noise which human can hear may occurs while the modulated high-frequency sound is transmitting. To avoid such audio noise interference, the communication signal Sr is transferred to the baseband signal Sb with smoother transitions, so the remote communication functionality is smoothly integrated with the audio system.

As shown in FIG. 2, in an embodiment of the invention, frequency of the baseband signal Sb (i.e., the envelope of the high-frequency sound) can be 100 Hz (the notation "freq" in FIG. 2 means frequency), and the high-frequency sound can have an ultrasound/quasi-ultrasound frequency of 21 kHz (21000 Hz). Various digital formats, such as RZ (Return-to-Zero) and/or NRZ (Non-Return-to-Zero), can be adopted to represent the digital communication signal Sr, also the communication signal Sr can be a coded digital signal.

Figure 3:
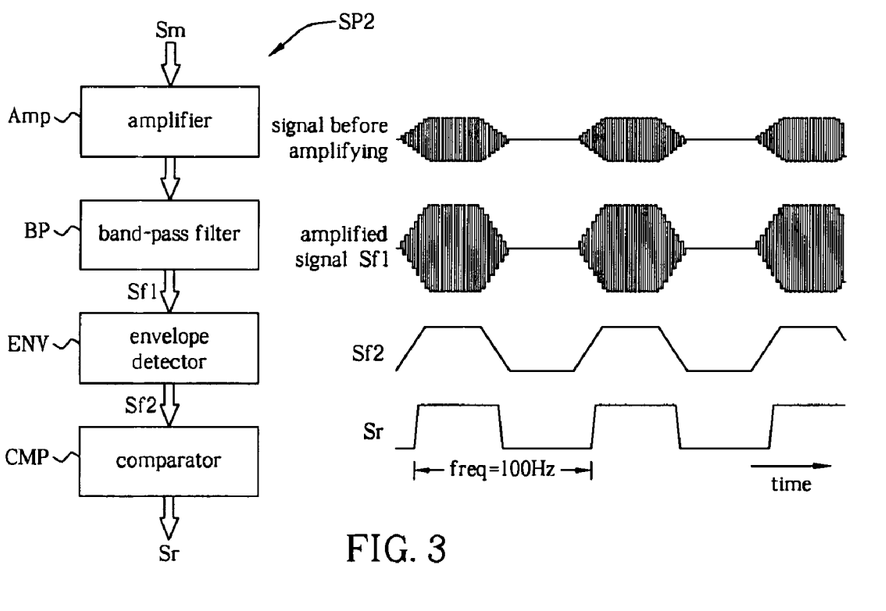
FIG. 3 illustrates a communication receiving device and how it works according to one embodiment of the invention.

Please refer to FIG. 3, which illustrates an embodiment for retrieving the communication signal in the high-frequency sound in the communication receiving device (e.g., the device B). The signal processor SP2 can exemplarily include an amplifier Amp, a band-pass filter BP, an envelope detector ENV and a comparator CMP. Also FIG. 3 shows related signal waveforms of the above circuits, the transverse axis of each waveform means time, and the longitudinal axis means amplitude. As shown in FIG. 3, when the acoustic receiver in the device B receives sounds (including audio sounds and the high-frequency sound Sw) and transfers the sounds to a corresponding electronic signal Sm (FIG. 1), the signal Sm will be amplified. After filtering of the band-pass filter BP, the portion corresponding to audio sounds in the signal Sm is filtered and the portion corresponding to the high-frequency sound Sw is kept as a signal Sf1. The envelope detector ENV detects the low-frequency envelope of the signal Sf1 and generates a corresponding (envelope) signal Sf2. Then the comparator CMP compares the signal Sf2 with a predetermined signal level to generate a corresponding digital signal accordingly, and this digital signal is the retrieved communication signal Sr carried in the high-frequency sound.

In the embodiment of FIG. 3, in addition to the various blocks BP, ENV and CMP for retrieving the communication signal in the high-frequency sound, optional audio-related blocks can also be included. For such kind of embodiment, please refer to FIG. 4. Following the embodiment in FIG. 1, the signal processor SP2 in FIG. 4 can include an amplifier Amp, a band-pass filter BP, an energy detector DT, a comparator CMP and an audio processor ASP. The amplifier Amp, the band-pass filter BP and the comparator CMP have the same functions as blocks of same labels in FIG. 3, the energy detector DT can be the envelope detector ENV. Similar to FIG. 3, the acoustic receiver RX1 in FIG. 4 receives sounds (including the high-frequency sound and/or audio sounds) and transfers (converts) the received sounds to a corresponding signal which is then amplified to a signal Se. And the band-pass filter BP, the energy detector DT and the comparator CMP extract the portion corresponding to the high-frequency sound in the signal Se and retrieve the communication signal Sr for the remote communication functionality.

Figure 4:
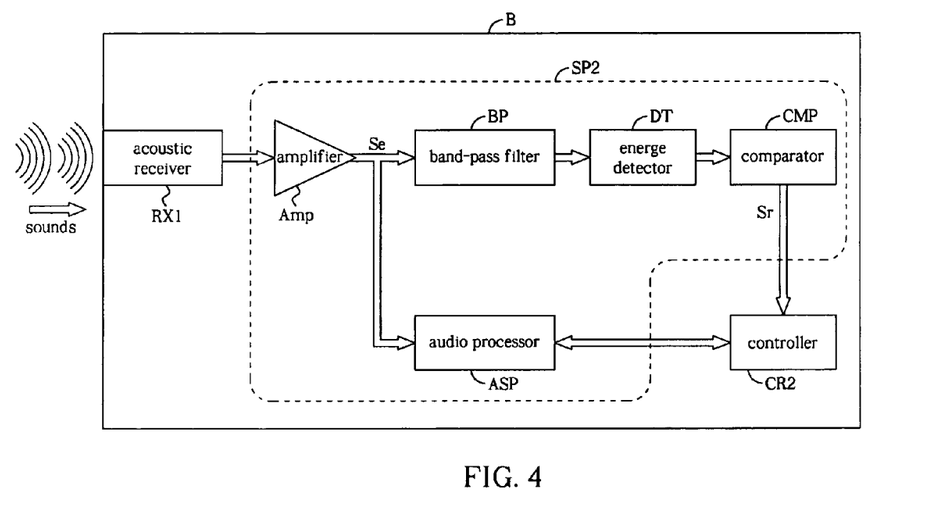
FIG. 4 illustrates a communication receiving device according to another embodiment of the invention.

On the other hand, as shown in FIG. 4, the signal Se amplified by the amplifier Amp can also be sent to the audio processor ASP, which handles the portion corresponding to audio sounds in the signal Se. For example, the audio processor ASP can have a low-pass filter (not shown) to extract the low-frequency portion corresponding to audio sounds, such that the audio processor can perform further processing for the extracted audio portion. As an example, the audio processor ASP can further include a voice identification circuit (not illustrated) to identify voice commands in audio sounds. Or, the audio processor ASP can have a signal encoding/compression circuit and/or a recording mechanism for encoding, compressing and recording the audio sounds. As discussed above, because the frequency of the high-frequency sound is higher than that of audio sounds, the remote communication functionality (exemplarily implemented by band-pass filter BP, energy detector DT and comparator CMP) can be seamlessly integrated into an audio system without interfering the original audio functions of the audio system.

Figure 5:
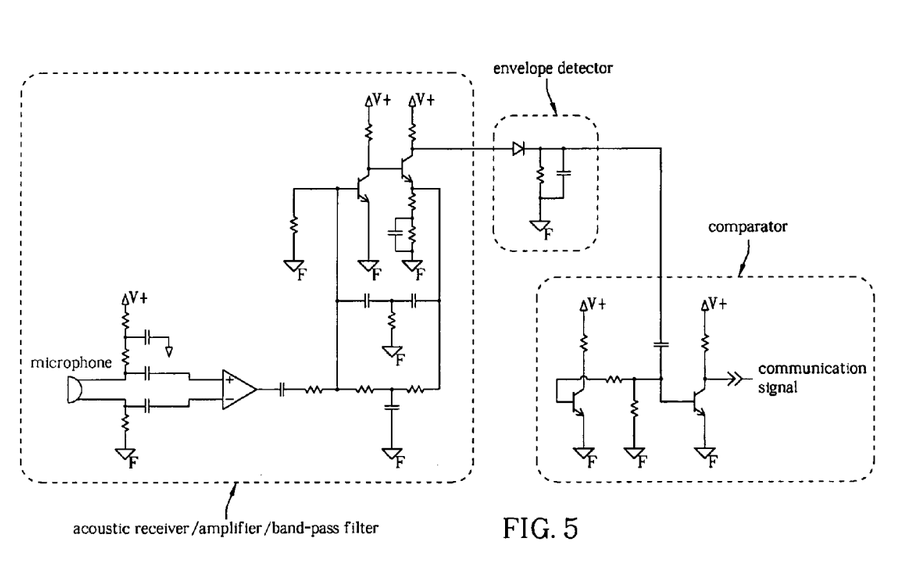
FIG. 5 illustrates a circuit embodiment for the disclosed communication receiving device.
Figure 6:
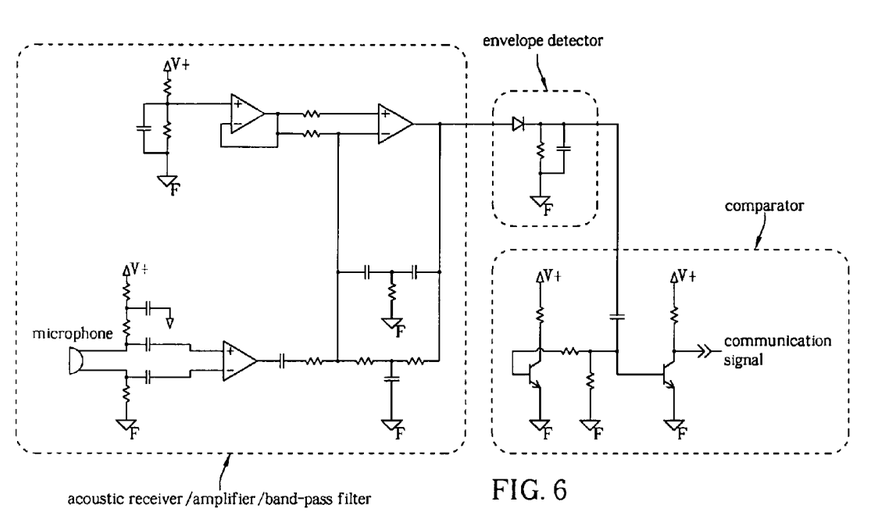
FIG. 6 illustrates another circuit embodiment for the disclosed communication receiving device.

A further embodiment for blocks in FIG. 3 is illustrated in FIG. 5. Following the embodiments in FIG. 1 and FIG. 3, FIG. 5 shows a circuitry embodiment for the communication receiving device (e.g., the device B in FIG. 1). In addition, FIG. 6 illustrates still another embodiment for the communication receiving device, wherein the notations V+ and F in FIGS. 5 and 6 respectively represent positive and ground operation bias voltages. As shown in these two figures, the remote communication functionality of the invention can be indeed integrated into ordinary audio systems. It should be understood that FIGS. 5 and 6 represent just two embodiments of the invention, other circuitry with same functions can be adopted to implement the invention.

Figure 7:
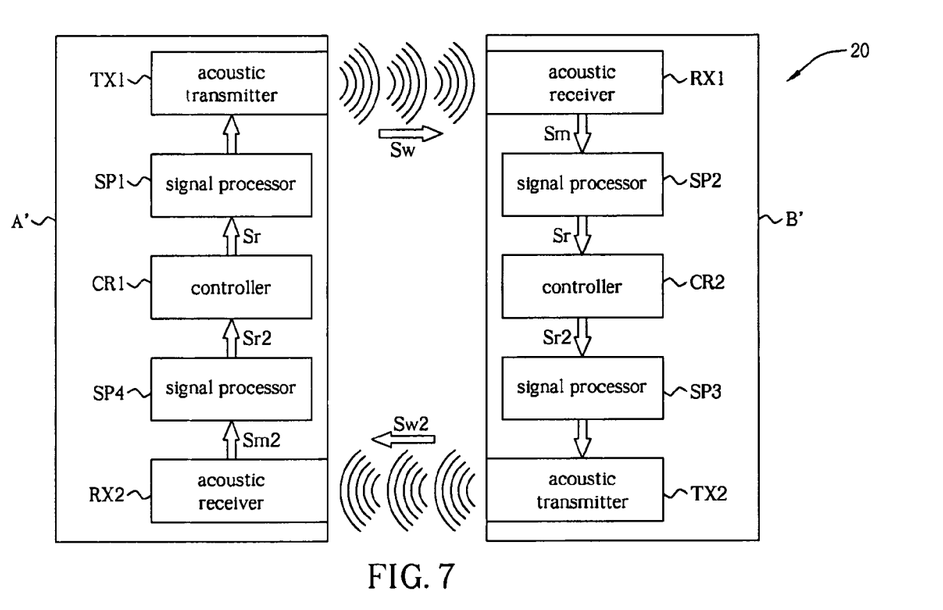
FIG. 7 illustrates an audio system according to another embodiment of the invention.

In the embodiment of FIG. 1, the device A communicates with the device B. To enhance mutual interactions between the two devices, both devices can be equipped with transmitting and receiving capabilities. Please refer to FIG. 7 for such embodiment; FIG. 7 illustrates an audio system 20 according to another embodiment of the invention. Similarly, the audio system 20 can include two (or more) audio electronic devices, two devices A' and B' are included in FIG. 7 for exemplary explanation. The devices A' and B' respectively include controller CR1 and CR2 for controlling operations of the devices A' and B' and for coordinating remote communication functionality between the devices. In FIG. 7, the device A' communicates with the device B' by a signal processor SP1 and an acoustic transmitter TX1 in the device A' and an acoustic receiver RX1 and a signal processor SP2 of the device B'.

On the other hand, the device B' can further have another signal processor SP3 (which can be considered as a third signal processor) and another acoustic transmitter TX2 (as a second acoustic transmitter), and the device A' can also include another acoustic receiver RX2 (as a second acoustic receiver) and another signal processor SP4 (as a fourth processor), such that the device B' can also communicate with the device A'. The signal processor SP3 in the device B' is capable of modulating a communication signal Sr2 (a second communication signal) to high frequency to be transmitted as a high-frequency sound Sw2 by the acoustic transmitter TX2. The acoustic receiver RX2 in the device A' receives the high-frequency sound Sw2 such that the signal processor SP4 can retrieve the communication Sr2, and the controller CR1 can control the device A' accordingly. In this way, the device B' can also communicate with the device A'. Similar to the acoustic transmitter TX1/receiver RX1, the acoustic transmitter TX2/receiver RX2 can be ordinary audio transmitter/receiver, like an audio speaker and a microphone. While implementing the above interactive remote communication functionality, identifying codes can be encoded in the communication signals by respective devices for coordinating and identifying each other. Various identifying and coordination protocols known in public can be adopted in aforementioned communication functionality, so further details are omitted here. Also, the modulation/demodulation scheme for the communication signal Sr2 between the signal processors SP3/SP4 can be the same as that for the communication signal Sr between the signal processors SP1/SP2, or the modulation/demodulation scheme between the signal processors SP3/SP4 can be different from that between the signal processor SP1/SP2. Digital formats and encoding schemes of communication signals Sr and Sr2 can also be the same or different.

To sum up, the invention discloses a technique which ordinary audio systems can be adopted to implement an ultrasound/quasi-ultrasound remote communication functionality. Comparing to prior art remote communication techniques, the invention can effectively reduce the cost for implementing remote communication functionality, so the convenience of remote communication can be widely prevail. In fact, many electronic devices are already built-in with audio related circuits, such as audio speakers, beepers, microphones, audio controllers and/or audio microprocessor. For example, many electronic devices are capable of reflecting operation modes and results with music, voices and/or beeps, like beeping while a user pressing a button. Also, voice and/or sound controlled devices are very common. For example, some lighting devices can be activated by sound of applause, some kinds of devices, like cell phones, portable computers and toys can be controlled by voice commands, such that the devices perform specific actions in response to specific user voice commands. In these devices built-in with audio related circuits, the invention can utilize these audio related circuits to enhance these devices with remote communication functionality, so these devices become more valuable and convenient. In another respect, because the audio related circuits are low-cost, the invention can still implement remote communication functionality in devices with costs lower than prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An audio system integrated with ultrasound/quasi-ultrasound communication functionality, comprising:
   a first device, comprising a first signal processor and an acoustic transmitter, the first signal processor capable of transferring a communication signal to a corresponding baseband signal such that transitions in the communication signal are transferred to smoother transitions in the baseband signal, and modulating the communication signal to an ultrasound/quasi-ultrasound according to the baseband signal, the acoustic transmitter capable of transmitting the ultrasound/quasi-ultrasound and an audio sound, wherein a frequency of the ultrasound/quasi-ultrasound is higher than a frequency of the audio sound; and
   a second device, comprising an acoustic receiver and a second signal processor, the acoustic receiver capable of receiving the audio sound and the ultrasound/quasi-ultrasound, and the second signal processor capable of demodulating the ultrasound/quasi-ultrasound to retrieve the communication signal.

2. The audio system of claim 1, wherein the acoustic transmitter is a speaker or a beeper and the acoustic receiver is a microphone.

3. The audio system of claim 1, wherein the second device further comprises:
   a third signal processor capable of modulating a second communication signal to a second ultrasound/quasi-ultrasound; and
   a second acoustic transmitter capable of transmitting an second audio sound and the second ultrasound/quasi-ultrasound, wherein a frequency of the second ultrasound/quasi-ultrasound is higher than a frequency of the second audio sound.

4. The audio system of claim 3, wherein the first device further comprises:
   a second acoustic receiver capable of receiving the second audio sound and the second ultrasound/quasi-ultrasound; and
   a fourth signal processor capable of demodulating the second ultrasound/quasi-ultrasound to retrieve the second communication signal.

5. The audio system of claim 1, wherein the first signal processor carries the communication signal in an envelope of the ultrasound/quasi-ultrasound by performing amplitude-modulation.

6. The audio system of claim 5, wherein the first signal processor modulates the ultrasound/quasi-ultrasound by the amplitude-modulation according to the baseband signal.

7. The audio system of claim 1, wherein the second signal processor comprises a band-pass filter capable of filtering the audio sound and keeping the ultrasound/quasi-ultrasound.

8. The audio system of claim 7, wherein the second signal processor further comprises an envelope detector and a comparator, the envelope detector is capable of detecting an envelope of the ultrasound/quasi-ultrasound, and the comparator is capable of comparing the envelope with a pre-determined signal level such that the communication signal can be retrieved.

9. The audio system of claim 1, wherein the second signal processor comprising an audio processor capable of handling the audio sound.

10. The audio system of claim 9, wherein the audio processor comprises a low-pass filter capable of filtering the ultrasound/quasi-ultrasound and keeping the audio sound.

11. A device integrated with ultrasound/quasi-ultrasound communication functionality comprising:
    a signal processor, capable of transferrin a communication signal to a corresponding baseband signal such that transitions in the communication signal are transferred to smoother transitions in the baseband signal, and modulating the communication signal to an ultrasound/quasi-ultrasound according to the baseband signal; and
    an acoustic transmitter, capable of transmitting an audio sound and the ultrasound/quasi-ultrasound, wherein a frequency of the ultrasound/quasi-ultrasound is higher than a frequency of the audio sound.

12. The device of claim 11, wherein the acoustic transmitter is a speaker or a beeper.

13. The device of claim 11, wherein the signal processor carries the communication signal to the ultrasound/quasi-ultrasound in envelope by performing amplitude-modulation.

14. The device of claim 13, wherein the signal processor transfers the communication signal to the corresponding baseband signal and then modulates the ultrasound/quasi-ultrasound by the amplitude-modulation according to the baseband signal.

15. A device integrated with ultrasound/quasi-ultrasound communication functionality compromising:
    a microphone, capable of receiving an audio sound and a ultrasound/quasi-ultrasound, wherein the ultrasound/quasi-ultrasound carries a communication signal by modulation; and a signal processor, capable of demodulating the ultrasound/quasi-ultrasound to retrieve the communication signal, wherein the signal processor comprising a band-pass filter, an envelope detector and a comparator; the band-pass filter is capable of filtering the audio sound and keeping the ultrasound/quasi-ultrasound, the envelope detector is capable of detecting an envelope of the ultrasound/quasi-ultrasound, and the comparator is capable of comparing the envelope with a pre-determined signal level such that the communication signal can be retrieved.

16. A method capable of integrating communication functionality in an audio system, comprising:

modulating a communication signal to an ultrasound/quasi-ultrasound by transferring the communication signal to a corresponding baseband signal such that transitions in the communication signal are transferred to smoother transitions in the baseband signal, and by modulating the ultrasound/quasi-ultrasound according to the baseband signal; and transmitting the ultrasound/quasi-ultrasound and an audio sound with an audio transmitter, wherein a frequency of the ultrasound/quasi-ultrasound is higher than a frequency of the audio sound.

17. The method of claim 16 further comprising:

receiving the ultrasound/quasi-ultrasound with an audio receiver; and demodulating the ultrasound/quasi-ultrasound to retrieved the communication signal.

18. The method of claim 17, wherein demodulating the ultrasound/quasi-ultrasound to retrieved the communication signal is achieved by detecting an envelope of the ultrasound/quasi-ultrasound, and comparing the envelope with a predetermined signal level to retrieve the communication signal.

* * * * *